(12) United States Patent
Semmere et al.

(10) Patent No.: US 7,717,983 B2
(45) Date of Patent: May 18, 2010

(54) AIR SEPARATION MODULE WITH LOAD CARRYING CENTER TUBE

(75) Inventors: Dan Semmere, Mission Viejo, CA (US); Dan E. Linker, Fort Worth, TX (US); Scott D. Pearson, Trabuco Canyon, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 752 days.

(21) Appl. No.: 11/550,678

(22) Filed: Oct. 18, 2006

(65) Prior Publication Data

US 2010/0024649 A1 Feb. 4, 2010

Related U.S. Application Data

(60) Provisional application No. 60/727,776, filed on Oct. 18, 2005.

(51) Int. Cl.
  *B01D 53/22* (2006.01)
(52) U.S. Cl. .................. 96/8; 96/4; 96/10; 95/47; 95/54; 210/321.79; 210/321.8; 210/321.88; 210/321.89
(58) Field of Classification Search .......... 96/4, 96/6, 7, 8, 10; 95/45, 47, 54; 210/321.6, 210/321.78, 321.79, 321.8, 321.88, 321.89, 210/321.99
See application file for complete search history.

(56) References Cited

U.S. PATENT DOCUMENTS

| | | | |
|---|---|---|---|
| 2,488,807 A | 11/1949 | Currie | |
| 4,265,763 A | 5/1981 | Bollinger et al. | |
| 4,508,548 A | 4/1985 | Manatt | |
| 4,752,305 A | 6/1988 | Johnson | |
| 4,871,379 A | 10/1989 | Edwards | |
| 4,961,760 A * | 10/1990 | Caskey et al. | 96/8 |
| 5,013,331 A | 5/1991 | Edwards et al. | |
| 5,034,125 A * | 7/1991 | Karbachsch et al. | 96/8 |
| 5,141,640 A * | 8/1992 | Sasajima et al. | 210/321.8 |
| 5,158,581 A | 10/1992 | Coplan | |
| 5,288,308 A | 2/1994 | Puri et al. | |
| 6,139,810 A | 10/2000 | Gottzmann et al. | |
| 6,153,097 A | 11/2000 | Jensvold et al. | |
| 6,224,763 B1 * | 5/2001 | Feng et al. | 210/321.8 |
| 6,558,450 B2 * | 5/2003 | Sengupta et al. | 96/8 |
| 6,632,356 B2 * | 10/2003 | Hallan et al. | 210/321.78 |
| 6,746,513 B2 | 6/2004 | Anderson | |
| 7,459,084 B2 * | 12/2008 | Baig et al. | 96/4 |

* cited by examiner

*Primary Examiner*—Jason M Greene
(74) *Attorney, Agent, or Firm*—Renner, Otto, Boisselle & Sklar, LLP

(57) ABSTRACT

An air separation module comprising a bundle of hollow elongated membranes, and a pressure vessel enclosing the bundle. The pressure vessel includes an outer tube, end caps at opposite ends of the tube, and an inner tube located within the fiber bundle. The inner tube is fixedly mechanically connected at opposite ends to the end caps to form a structural spine of the pressure vessel, whereby loads acting on the air separation module are transferred between the end caps primarily by the center tube.

12 Claims, 3 Drawing Sheets

AIR SEPARATION MODULE WITH LOAD CARRYING CENTER TUBE

RELATED APPLICATIONS

This application claims the benefit of U.S. Provisional Application No. 60/727,776 filed Oct. 18, 2005, which is hereby incorporated herein by reference.

FIELD OF THE INVENTION

The invention herein described relates to gas separation modules and more particularly to air separation modules useful in inerting systems such as those employed in aircraft.

BACKGROUND

In general, the phenomenon of combustion or fire requires three items to be present: fuel, oxidizer and an ignition source. These three items represent the verticies of the so-called "fire triangle". If any one of these three items is not present in sufficient quantities, combustion cannot take place or be sustained.

Aircraft fuel tank explosions can occur when these three items are present in the ullage space above the liquid fuel in the fuel tank. A fire in the ullage creates a rapid pressure rise (an explosion) in the fuel tank that causes a structural failure of the airframe. In this case, the components of the fire triangle are as follows. The fuel source is the jet fuel vapor that has liberated itself (evaporated) from the liquid fuel, the oxidizer is atmospheric oxygen that is present in the ullage, and the ignition source could be any one of a variety of sufficiently energetic sources such as a spark from an electromechanical component in the fuel tank.

As in-tank fires are rare events indeed, it suggests that while these three items may be present in the fuel tank, the conditions for combustion are not easily satisfied. In fact, the range of air and fuel mixtures that will allow combustion is fairly constrained. Because the amount of oxygen is dependent upon the local atmospheric pressure and the amount of vaporized fuel in the ullage is also dependent upon this pressure as well as the temperature of the fuel, the air-fuel mixture in the ullage space is strongly dependent upon the pressure in the tank and the temperature of the liquid fuel. Consequently, the air-fuel ratios necessary for combustion are met only under certain altitude and fuel temperature conditions.

The challenge of the fuel tank inerting problem is to blanket the ullage space in the fuel tank with an appropriate amount of nitrogen to prevent combustion. Because nitrogen is a spectator in the combustion process, it acts as a diluent to atmospheric oxygen and effectively lowers the flammability of the fuel tank.

One of the means by which an airplane fuel tank may be inerted is to employ a system that uses air separator technology to blanket the ullage space of the fuel tank with nitrogen. These air separators typically employ a hollow-fiber membrane that allows the preferential passage of oxygen. When a bundle of these hollow fibers is exposed to an adequate pressure differential, they will permeate oxygen much more readily than nitrogen. Consequently, it is possible to separate the oxygen from the nitrogen of atmospheric air and pass the then nitrogen-enriched air along to the airplane fuel tank.

The inerting of an airplane fuel tank presents a significant design challenge to provide a desired level of fuel tank safety at the lowest penalty to the airplane. The penalty to the airplane comes in the form of inerting system weight, parasitic losses, and cooling losses. Each of these three elements requires the airplane to burn more fuel and/or carry less payload. The operators of these aircraft desire a system that provides necessary inertness at the lowest cost and weight.

The air separation module (ASM) is one of the most significant elements of an aircraft inerting system. The cost and weight of the ASM is a key driver in a decision to implement an inerting system on an aircraft. Current technology utilizes the external housing of the ASM as the structural member for translating the loads, which can be substantial, from the ASM to the aircraft structure. Due to the dimensional variations of producing a hollow membrane fiber bundle, the ASM housing becomes more complex driving both weight and cost into the overall ASM design. The current methods for addressing the large tolerance accumulations, thermal growth, pressure containment and aircraft vibration environments have negatively impacted the weight and cost of the ASM.

SUMMARY OF THE INVENTION

The present invention provides a novel and inventive approach for providing the mechanical ASM housing to address the large tolerance accumulations, thermal growth, pressure containment and aircraft induced vibrations issues. This approach utilizes the center tube of a hollow membrane fiber bundle as a structural element for the housing design. This allows the pressure vessel end caps to be mechanically coupled to the fiber bundle via the center tube, thus eliminating the tolerance accumulation issue and eliminating a significant portion of the thermal growth concerns. Further in accordance with the invention, the ASM preferably incorporates a "floating" external tube to provide a pressure containment feature of the ASM and/or an anti-rotation feature to prevent the end caps from loosening due to the aircraft vibration environment. The tube may be sealed on either end by O-rings to provide pressure containment, while allowing the fiber bundle and end caps to move axially due to thermal expansion or contraction. The remaining thermal growth concern can be resolved by a "dagger pin" incorporated in one end of the housing that allows for a sliding fit between the aircraft structure and the ASM housing.

This design approach optimizes the overall weight of the ASM by allowing for the most compact design with the fewest number of components. Additionally, the assembly time of a preferred ASM assembly is optimized by eliminating procedures such as welding, curing time for sealants, and/or specialized assembly fixtures, such as those used for riveting. Provision can also be made for easy disassembly of the ASM in the event that a unit, such as when the ASM fails to meet the required performance defined in an end item acceptance test procedure.

Accordingly, the invention provides an air separation module comprising a bundle of hollow elongated membranes, and a pressure vessel enclosing the bundle. The pressure vessel includes an outer tube, end caps at opposite ends of the tube, and an inner tube located within the fiber bundle. The inner tube is fixedly mechanically connected at opposite ends to the end caps to form a structural spine of the pressure vessel, whereby loads acting on the air separation module are transferred between the end caps primarily by the center tube.

In a preferred embodiment, at least one end of the outer tube is connected to the respective end cap by a connection that permits limited movement of the outer tube relative to the end cap, such as a telescoping connection. Telescoping portions of the outer tube and respective end cap can be sealed by an annular seal interposed between the telescoping portions and/or may include anti-rotation devices preventing rotation of the outer tube relative to the respective end cap.

Further in accordance with the invention, one of the end caps may have a central threaded portion screwed onto a correspondingly threaded end portion of the inner tube. The other end cap may have a central portion telescopically mated with an end of the inner tube, and an attachment member may have an inner portion threaded into the end of the inner tube, a central portion engaging an outer side of the end cap for securing the end cap to the inner tube, and an outer dagger portion extending from the end cap to provide for telescopic coupling to an external component. The central portion and/or dagger portion can be provided with wrenching surfaces for a wrench used to rotate the attachment member for securement to the inner tuber or removal from the inner tube.

As is preferred, the fiber bundle and end caps can move axially relative to the outer tube to accommodate differential thermal expansion or contraction.

According to another aspect of the invention, a method of assembling an air separation module comprises the steps of securing a first end cap to an end of a central tube, installing a bundle of fibers around the central tube, assembling an outer tube to the first end cap, with the outer tube surrounding the bundle of fibers, assembling a second end cap to the outer tube, and after the foregoing steps, screwing an attachment member into an end of the inner tube to axially hold the second end cap to the inner tube.

Further features of the invention will become apparent from the following detailed description when considered in conjunction with the drawings.

BRIEF DESCRIPTION OF THE DRAWINGS

In the annexed drawings.

DETAILED DESCRIPTION

Figure 1:
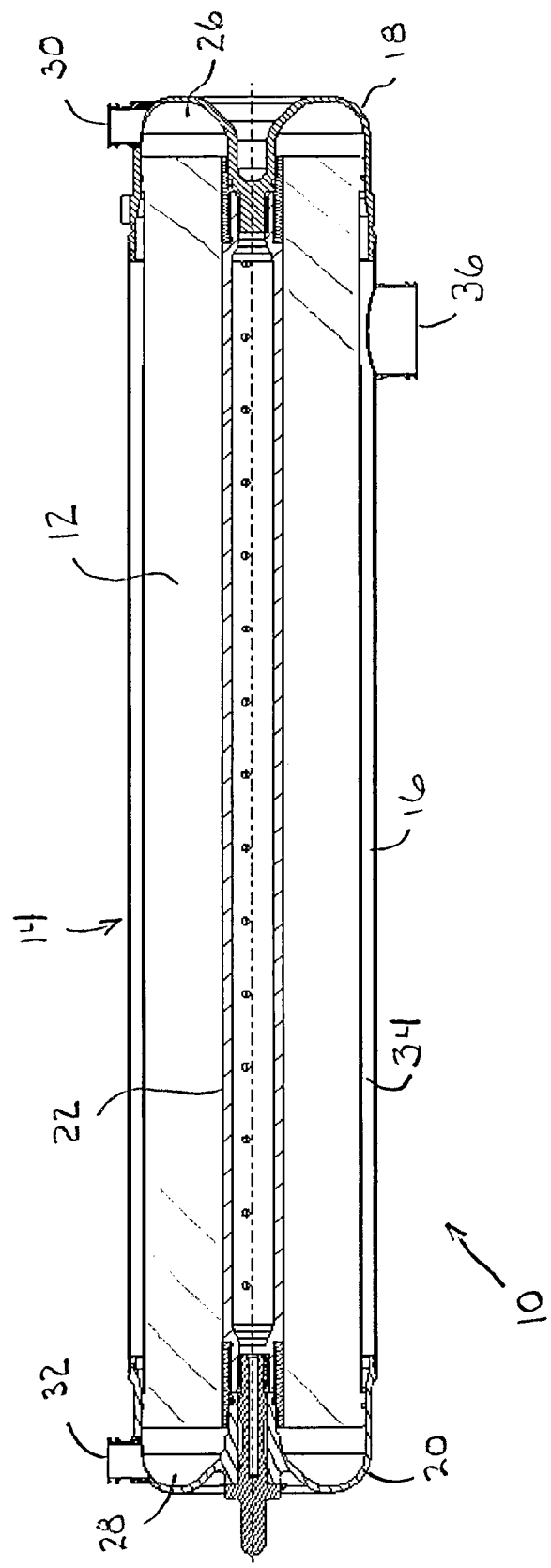
FIG. 1 is a cross-sectional view of an exemplary air separation module according to the invention.

Referring now in detail to the drawings and initially to FIG. 1, an exemplary air separation module (ASM) according to the invention is indicated generally at 10. The ASM 10 generally comprises a bundle 12 of hollow elongated fiber membranes, and a pressure vessel 14 (herein also referred to as a housing) enclosing the bundle 12. The pressure vessel 14 includes an outer tube 16, end caps 18 and 20 at opposite ends of the tube, and an inner tube 22 located within the fiber bundle 12.

In the illustrated embodiment, each hollow fiber membrane of the bundle 12 has opposite ends opening to respective chambers 26 and 28 at the ends of the pressure vessel 14 which communicate with respective ports 30 and 32. Accordingly, the fiber membranes provide a flow path for a mixture of gases from one end chamber to the other. The end chambers are isolated from an interior collection chamber 34 through which the hollow fiber membranes pass, and thus the interior flow passages of the hollow fiber membranes are separated from the collection chamber by the walls of the hollow fiber membranes. The collection chamber communicates with a port 36 provided on the outer tube 16.

The membrane material acts as a selective barrier or transport medium, so that one or more of the components of a mixture of gases move(s) through the membrane at a higher rate than one or more other component(s). In a preferred air separation module, the membrane material is more permeable to oxygen than nitrogen, such that when air is passed through hollow fiber membranes from one end chamber to the other, oxygen will permeate more readily through the fiber walls and into the collection chamber. Consequently, the remaining retentate stream exiting the ASM will be nitrogen-enriched air. Typically the supply air will be at elevated temperature to promote oxygen permeation. In addition, the supply stream will typically be at a pressure higher than the pressure in the collection chamber to create a pressure differential across the walls of the hollow fiber membranes. The temperature, pressures and flow rates can be optimized in known manner to attain the desired level of nitrogen-enrichment.

The hollow fiber membranes can be of various types and forms, such as individual hollow fiber membranes, a plurality of hollow fiber membranes intermingled with each other and bundled together as above described, cartridges sheets of hollow fiber membranes, etc. Most often, however, a plurality of hollow fiber membranes will be bundled together and extend axially between the end chambers. The ends of the bundle will be suitably cinched or otherwise joined together as in a known manner to prevent flow of gas between the end chambers 26 and 28 and the collection chamber 34. Moreover, the ends of the bundle may be sealed to the end caps by respective annular seals, such as the illustrated O-rings 38 and 40 best seen in FIGS. 2 and 3.

In accordance with the present invention, the inner tube 22 is fixedly mechanically connected at opposite ends to the end caps 18 and 20 to form a structural spine of the pressure vessel 14, whereby loads acting on the air separation module are transferred between the end caps primarily by the center tube. In aircraft applications, these loads can be substantial. For instance, the ASM may be subjected to vibration and load shocks as high as 40 g's.

In contrast to prior art designs, the outer tube 16 or housing member is not intended to carry any significant loads. Rather, at least one end of the outer tube is connected to the respective end cap by a connection that permits limited movement of the outer tube relative to the end cap. In the illustrated embodiment, both ends of the outer tube 16 are connected to the respective end caps 18 and 20 for limited relative movement by a telescoping connection. The telescoping portions of the outer tube and respective end cap can be sealed by an annular seal, such as O-rings 44 and 46, interposed between the telescoping portions. In addition, anti-rotation devices may be provided to prevent rotation of the outer tube relative to the respective end cap. In the illustrated embodiment, the end caps 18 and 20 each have diametrically opposed, radially projecting tabs 48 that are received in axially extending slots in the outer tube. The slots open radially to the end face of the outer tube and slidably receive the tabs with a close but slip fit. The tabs and slots are correspondingly sized in circumferential width to restrict rotation of the outer tube relative to the end caps. The axial lengths of the slots may also be selected such that the bottoms (axially inner ends) of the slots will engage the tabs to limit axial shifting of the outer tube relative each end cap to prevent separation of the outer tube from either end cap while still permitting axial shifting of the outer tube relative to at least one end cap to accommodate differential axial expansion of the outer tube relative to the inner tube and the bundle of hollow fiber membranes. Other types of devices may be used, such as axially extending grooves and beads.

Figure 2:
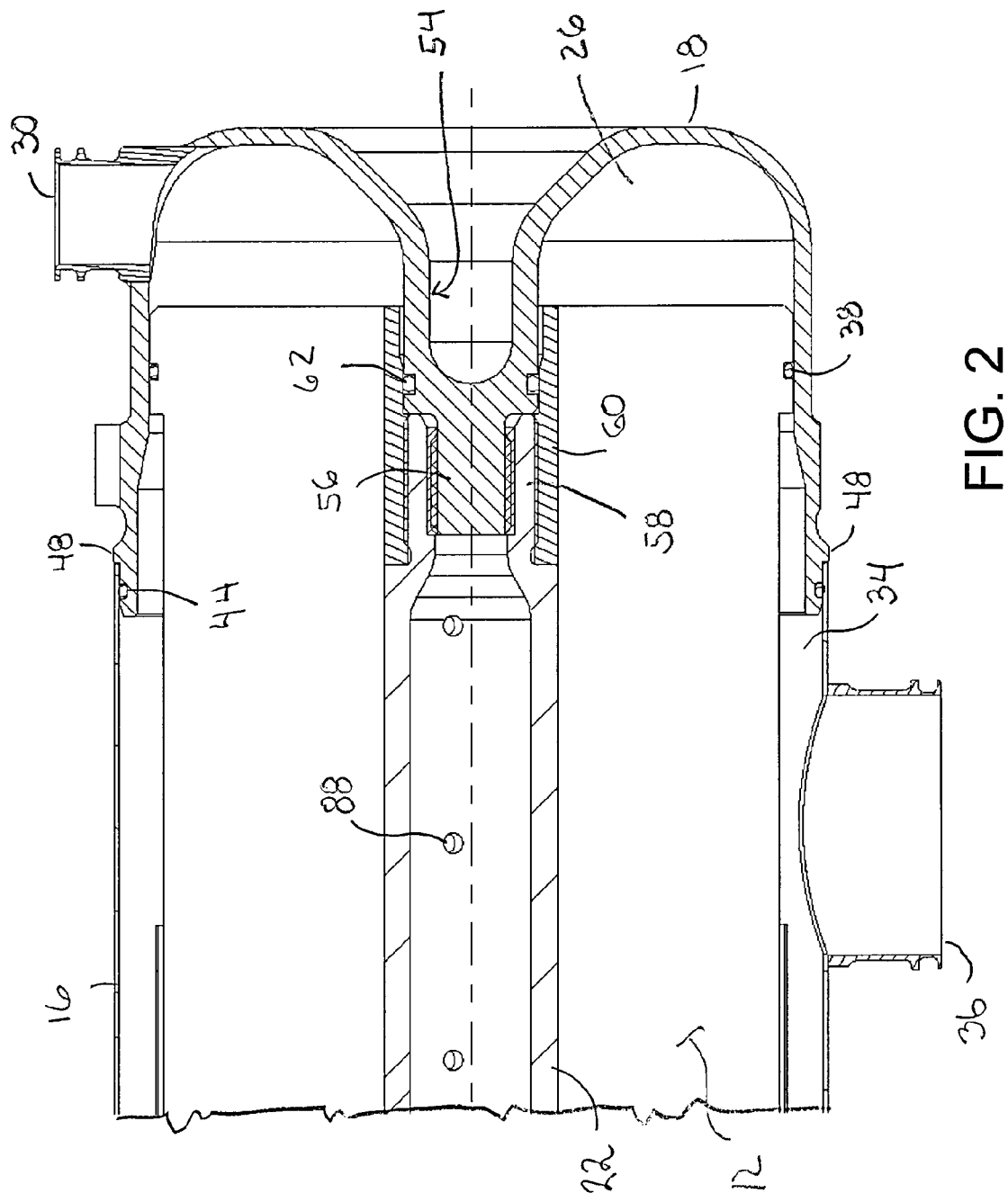
FIG. 2 is an enlarged right-hand portion of the air separation module of FIG. 1.

As seen in FIG. 2, the end cap 18 may have a core portion 54 including a threaded portion 56 screwed into a correspondingly externally threaded end portion 58 of the inner tube 22. The end cap core portion telescopes into a center core tube 60 and may be sealed to the core tube by an annular seal 62. The core tube 60 is internally threaded so that it can be screwed onto the end portion 58 which is corresponding externally threaded. As shown, the radially outer surface of the core tube may form a continuation of the radially outer surface of the inner tube. The core tube can function to center the end of the fiber bundle and effect a seal between the fiber bundle and the end of the inner tube.

Figure 3:
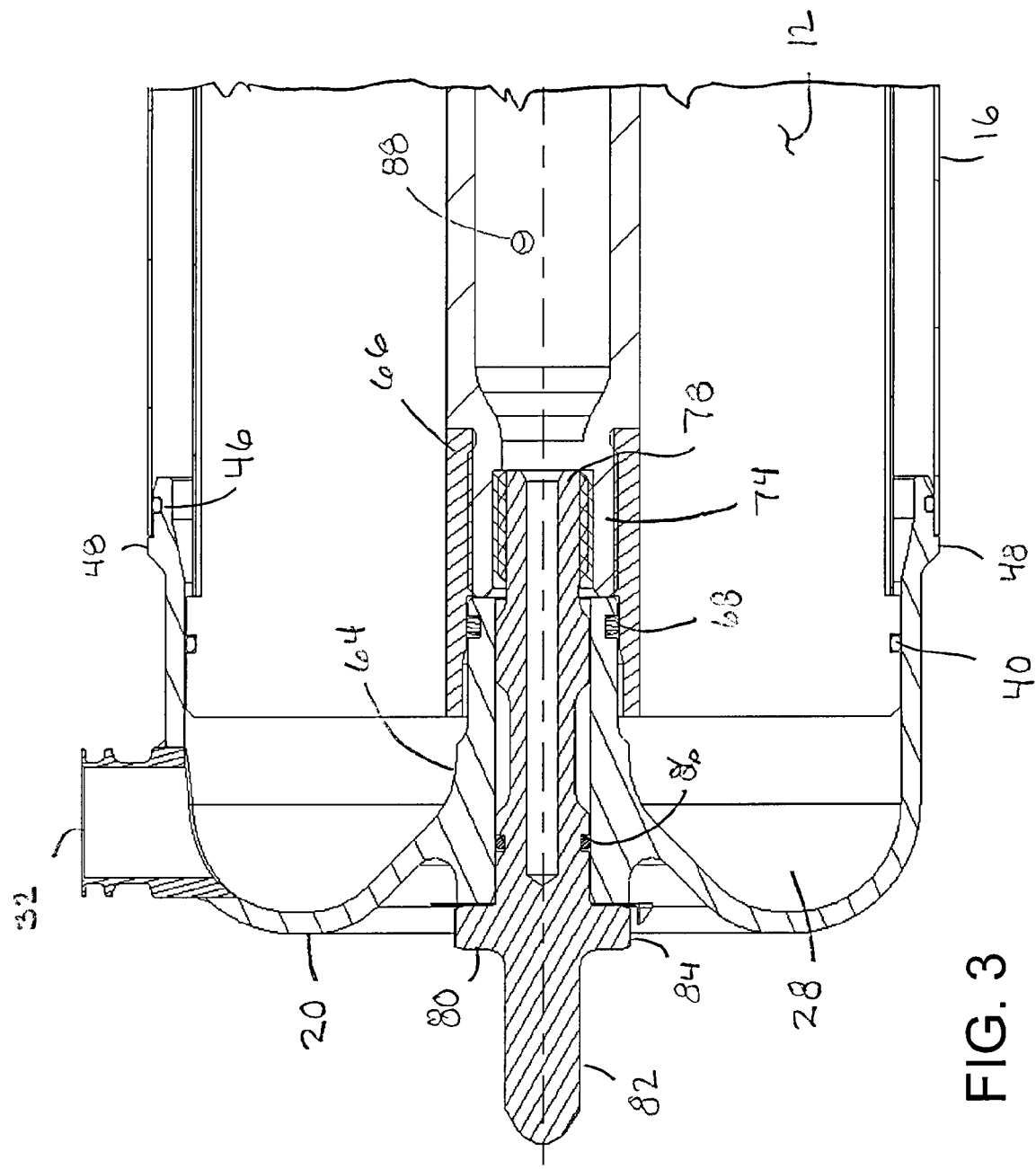
FIG. 3 is an enlarged left-hand portion of the air separation module of FIG. 1.

As seen in FIG. 3, the end cap 20 also has a core portion 64 telescoped into a center core tube 66 and sealed to the core tube by an annular seal 68. The core tube may have the same outer diameter as the inner tube 22 and may be threaded onto threaded end portion 74 of the inner tube 22. Unlike the core portion 54, the core portion 64 includes a through bore for passage of an attachment member 76. The illustrated attachment member 76 has an inner portion 78 threaded into the end portion 74 of the inner tube, a central portion 80 engaging an outer end of the core portion 64 of the end cap 20 for securing the end cap to the inner tube, and an outer dagger portion 82 extending from the end cap to provide for telescopic coupling to an external component. The central portion 80 and/or dagger portion 82 can be provided with wrenching surfaces 84 for a wrench used to rotate the attachment member for securement to the inner tuber or removal from the inner tube. The central portion of the attachment member may be provided with an annular groove for an annular seal 86 which seals the attachment member to the core portion of the end cap 20.

The foregoing arrangement allows the fiber bundle 12 and end caps 18 and 20 to move axially relative to the outer tube 16 to accommodate differential thermal expansion or contraction.

As shown, the inner tube 22 may be hollow for weight reduction and provided with holes 88 in the wall thereof to allow gas to flow through the tube, e.g. diametrically, for facilitating flow through the collection chamber and around the fiber membranes. The inner tube preferably is made of a high strength material, such as titanium, because of its above-mentioned load bearing function. In addition, the inner tube has a thickness considerably greater than the thickness of the outer tube, such as 5 or more times greater in thickness.

The ASM 10 can be easily assembled by assembling the fiber bundle 12 around the inner tube 22, with the core tubes 60 and 66 being used to support and center the ends of the fiber bundle. The end cap 18 may be threaded into the end of the inner tube and the outer tube 16 slipped over the fiber bundle and onto the end cap 18. Then the other end cap 20 can be assembled with the core portion being slipped into the core tube 66. The radially outer cylindrical end portion of the end cap will be telescoped into the outer tube. Thereafter, the attachment member is screwed into the end of the inner tube and torqued to a prescribed amount as desired.

The ASM can be used by connecting one of the ports 30 and 32 to a source of air and the other to a conduit for supplying nitrogen-enriched air to another component, such as the ullage of an aircraft fuel tank. In an aircraft application, usually hot gases are bled from an engine for supply to the ASM as the commonly used separation membranes operate more efficiently at higher temperatures, as is known in the art. The bleed air will also be at an elevated temperature to create a pressure differential between the internal flow passages of the hollow fiber membranes and the collection chamber 34. The collection chamber may be connected at the port 36 to a conduit for taking the oxygen away from the ASM. For example, the collection chamber may simply be vented to atmosphere if there is no need to retain the oxygen permeate.

It is noted that while reference is made to air as the mixture of gases that are passed through the ASM for separation of oxygen from the air, other gas mixtures may be operated on and the membrane material selected to remove one or more of the component gases from the mixture, leaving one or more other component gases at a higher concentration. The herein reference to air is made as a matter of convenience and is intended to include such other gas mixtures, unless otherwise clearly specified to the contrary.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An air separation module comprising a bundle of hollow elongated membranes, and a pressure vessel enclosing the bundle, the pressure vessel including an outer tube, end caps at opposite ends of the outer tube, and an inner tube located within the fiber bundle, the inner tube being fixedly mechanically connected at opposite ends to the end caps to form a structural spine of the pressure vessel, such that axial loads acting on the air separation module are transferred between the end caps primarily by the inner tube.

2. An air separation module according to claim 1, wherein at least one end of the outer tube is connected to the respective end cap by a connection that permits limited axial movement of the outer tube relative to the end cap.

3. An air separation module according to claim 2, wherein the connection includes telescoping portions of the outer tube and respective end cap.

4. An air separation module according to claim 3, including an annular seal interposed between the telescoping portions.

5. An air separation module comprising a bundle of hollow elongated membranes, and a pressure vessel enclosing the bundle, the pressure vessel including an outer tube, end caps at opposite ends of the outer tube, and an inner tube located within the fiber bundle, the inner tube being fixedly mechanically connected at opposite ends to the end caps to form a structural spine of the pressure vessel, whereby loads acting on the air separation module are transferred between the end caps primarily by the inner tube;

wherein the connection includes telescoping portions of the outer tube and respective end cap;

wherein the telescoping portions include anti-rotation devices preventing rotation of the outer tube relative to the respective end cap.

6. An air separation module according to claim 5, wherein the anti-rotation devices include cooperating axially extending grooves and ribs received in the ribs.

7. An air separation module according to claim 6, wherein the grooves and ribs further cooperate to limit the amount of overlap between the telescoping portions.

8. An air separation module according to claim 1, wherein one of the end caps has a central threaded portion screwed onto a correspondingly threaded end portion of the inner tube.

9. An air separation module comprising a bundle of hollow elongated membranes, and a pressure vessel enclosing the bundle, the pressure vessel including an outer tube, end caps at opposite ends of the outer tube, and an inner tube located within the fiber bundle, the inner tube being fixedly mechanically connected at opposite ends to the end caps to form a structural spine of the pressure vessel, whereby loads acting on the air separation module are transferred between the end caps primarily by the inner tube;

wherein one of the end caps has a central threaded portion screwed onto a correspondingly threaded end portion of the inner tube;

wherein the other end cap has a central portion telescopically mated with an end of the inner tube, and an attachment member has an inner portion threaded into the end of the inner tube, a central portion engaging an outer side of the end cap for securing the end cap to the inner tube, and an outer dagger portion extending from the end cap to provide for telescopic coupling to an external component.

10. An air separation module according to claim 9, wherein the central portion and/or dagger portion is/are provided with wrenching surfaces for a wrench used to rotate the attachment member for securement to the inner tube or removal from the inner tube.

11. An air separation module according to claim 1, wherein the fiber bundle and end caps can move axially relative to the outer tube to accommodate differential thermal expansion or contraction.

12. A method of assembling an air separation module, comprising the steps of securing a first end cap to an end of a central tube, installing a bundle of fibers around the central tube, assembling an outer tube to the first end cap, with the outer tube surrounding the bundle of fibers, assembling a second end cap to the outer tube, and after the foregoing steps, screwing an attachment member into an end of the central tube to axially hold the second end cap to the central tube.

* * * * *